United States Patent
Nosov et al.

(10) Patent No.: US 9,836,363 B2
(45) Date of Patent: Dec. 5, 2017

(54) SEMI-AUTOMATIC FAILOVER

(71) Applicant: Microsoft Corporation, Redmond, WA (US)

(72) Inventors: Alexander E. Nosov, Bellevue, WA (US); Tony Petrossian, Bellevue, WA (US); Sameer A. Verkhedkar, Issaquah, WA (US); Richard S. Bice, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 14/503,104

(22) Filed: Sep. 30, 2014

(65) Prior Publication Data
US 2016/0092322 A1 Mar. 31, 2016

(51) Int. Cl.
*G06F 11/20* (2006.01)
*H04L 29/08* (2006.01)
*H04L 29/14* (2006.01)
*H04L 12/24* (2006.01)
*H04L 29/06* (2006.01)

(52) U.S. Cl.
CPC ...... *G06F 11/2007* (2013.01); *H04L 41/0663* (2013.01); *H04L 67/1034* (2013.01); *H04L 67/1095* (2013.01); *H04L 69/40* (2013.01); *G06F 2201/85* (2013.01); *H04L 41/0668* (2013.01); *H04L 41/5016* (2013.01); *H04L 41/5025* (2013.01); *H04L 63/10* (2013.01)

(58) Field of Classification Search
USPC .......................................................... 714/6.1
See application file for complete search history.

(56) References Cited

U.S. PATENT DOCUMENTS

| | | | |
|---|---|---|---|
| 6,178,529 B1 * | 1/2001 | Short | G06F 11/2038 709/223 |
| 6,571,283 B1 * | 5/2003 | Smorodinsky | G06F 11/008 709/220 |
| 6,986,076 B1 | 1/2006 | Smith et al. | |
| 7,039,827 B2 | 5/2006 | Meyer et al. | |
| 7,444,536 B1 | 10/2008 | Jairath | |
| 7,502,884 B1 * | 3/2009 | Shah | H04L 67/1097 370/395.21 |

(Continued)

FOREIGN PATENT DOCUMENTS

WO 2012067929 A1 5/2012

OTHER PUBLICATIONS

"Switchover and Failover Operations", Retrieved on: Jul. 8, 2014, Available at: http://docs.oracle.com/cd/E11882_01/server.112/e17023/sofo.htm#DGBKR3410.

(Continued)

*Primary Examiner* — Kamini Patel
(74) *Attorney, Agent, or Firm* — Cooper Legal Group, LLC

(57) ABSTRACT

Semi-automatic failover includes automatic failover by a service provider as well as self-serviced failover by a service consumer. A signal can be afforded by a service provider based on analysis of an incident that affects the service provider. Initiation of self-serviced failover by a service consumer can be predicated on the signal. In one instance, the signal provides information that aids a decision of whether or not to failover. In another instance, the signal can grant or deny permission to perform a self-serviced failover.

19 Claims, 6 Drawing Sheets

(56) References Cited

U.S. PATENT DOCUMENTS

| | | | | |
|---|---|---|---|---|
| 7,734,945 | B1* | 6/2010 | Levidow | G06F 11/0793 714/3 |
| 8,073,880 | B2 | 12/2011 | Lamonica | |
| 8,103,906 | B1* | 1/2012 | Alibakhsh | H04L 67/42 714/13 |
| 8,255,369 | B2 | 8/2012 | Luo et al. | |
| 8,370,679 | B1* | 2/2013 | Gawali | G06F 11/2023 714/25 |
| 8,595,547 | B1 | 11/2013 | Sivasubramanian et al. | |
| 8,630,983 | B2 | 1/2014 | Sengupta et al. | |
| 8,676,763 | B2 | 3/2014 | Goodman et al. | |
| 2002/0133601 | A1 | 9/2002 | Kennamer et al. | |
| 2004/0153866 | A1* | 8/2004 | Guimbellot | H04L 1/22 714/4.11 |
| 2005/0102562 | A1* | 5/2005 | Shinohara | G06F 11/2028 714/15 |
| 2009/0254601 | A1* | 10/2009 | Moeller | G06F 9/542 709/201 |
| 2010/0077252 | A1* | 3/2010 | Siewert | G06F 11/2094 714/6.12 |
| 2012/0102486 | A1* | 4/2012 | Yendluri | G06F 9/5072 717/177 |
| 2014/0164831 | A1 | 6/2014 | Merriman et al. | |
| 2014/0281675 | A1* | 9/2014 | Sreenivasan | H04L 69/40 714/4.11 |

OTHER PUBLICATIONS

"Enabling or disabling forced failover", Retrieved on: Jul. 8, 2014, Available at: http://www-01.ibm.com/support/knowledgecenter/HSG_MSCS_120/UG/mscs_ug_ch5_enable_disable_failover.html.

"Disaster Recovery Planning Guide", In White Paper, Jul. 8, 2014, 11 pages.

"EMC Multisite Disaster Recovery for Microsoft Sql Server 2012", In White Paper, Jan. 23, 2014, 48 pages.

Mandle, Bernhard, "SQL Server AlwaysOn—no automatic failover when database files are lost", Published on: Apr. 15, 2014, Available at: http://connmove.eu/en/sql-server-alwayson-no-automatic-failover-when-database-files-are-lost/.

"AlwaysON—HADRON Learning Series: Automated Failover Behaviors (Denali—Logging History Information, FCI and Default Health Capture, s_server_diagnostics)", Published on: Mar. 22, 2012, Available at: http://blogs.msdn.com/b/psssql/archive/2012/03/22/alwayson-hadron-learning-series-automated-failover-behaviors-denali-logging-history-information-fci-and-default-health-capture-sp-server-diagnostics.aspx.

"How to find whether SQL Server had an Automatic Failover or a Manually initiated Failover in cluster", Published on: Jul. 25, 2011, Available at: http://sqllearnings.com/2011/07/25/how-to-find-whether-sql-server-had-an-automatic-failover-or-a-manually-initiated-failover-in-cluster/.

"Site Recovery Manager Administration Guide", Retrieved on: Jul. 8, 2014, Available at: http://www.vmware.com/pdf/srm_admin_5_0.pdf.

"Active Geo-Replication for Azure SQL Database", Retrieved on: Sep. 30, 2014, Available at: http://msdn.microsoft.com/en-us/library/azure/dn741339.aspx.

"Introducing Geo-replication for Windows Azure Storage", Published on: Sep. 15, 2011, Available at: http://blogs.msdn.com/b/windowsazurestorage/archive/2011/09/15/introducing-geo-replication-for-windows-azure-storage.aspx.

"Amazon RDS for MySQL", Retrieved on: Sep. 30, 2014, Available at: http://aws.amazon.com/rds/mysql/#features.

Smith, David P., "High Availability and Disaster Recovery at ServiceU: A SQL Server 2008 Technical Case Study", Published on: Aug. 2009, Available at: http://technet.microsoft.com/en-us/library/ee355221(v=SQL.100).aspx.

Breu, Roger, "SQL Server AlwaysOn Availability Groups—New combined HA/DR solution for SQL Server and the path to your own SQL Server Cloud", Published on: Aug. 26, 2011, Available at: http://blogs.technet.com/b/swisssql/archive/2011/08/26/sql-server-alwayson-availability-groups-new-combined-ha-dr-solution-for-sql-server-and-the-path-to-your-own-sql-server-cloud.aspx.

"Backup and Recovery Performance and Best Practices for Exadata Cell and Oracle Exadata Database Machine", In White Paper of Oracle Maximum Availability Architecture, Feb. 2013, 40 pages.

"Deploying Oracle Maximum Availability Architecture with Exadata Database Machine", In White Paper of Oracle Maximum Availability Architecture, Aug. 2013, 32 pages.

U.S. Appl. No. 13/784,825, Verbitski, et al., "Reconciliation of Geo-Replicated Database Clusters", filed Mar. 5, 2013.

U.S. Appl. No. 13/773,587, Talius, et al., "Data Seeding Optimization for Database Replication", filed Feb. 21, 2013.

"International Search Report & Written Opinion Issued in PCT Application No. PCT/US2015/052543", dated Dec. 17, 2015, 13 pages.

Int. Preliminary Report cited in PCT Application No. PCT/US2015/052543 dated Jan. 16, 2017, 16 pgs.

* cited by examiner

SEMI-AUTOMATIC FAILOVER

BACKGROUND

Creation and implementation of a disaster recovery plan is essential to enable recovery from a disaster. Disasters can include natural disasters, such as floods, tornadoes, or earthquakes, and man-made disasters including malicious activity and human error. Disasters such as these beget unavailability of hardware and software systems relied on by various entities. For example, if a data center employed by a business is rendered unavailable by a disaster, data will be unable to be read or written, and data may be lost.

Implementing data replication and failover as part of a disaster recovery plan for the application can provide a type of insurance against disasters or regional outages. Data replication is a process by which application data from a primary site is replicated or mirrored to a secondary site. If the primary site fails due to a disaster, an application is transitioned to the secondary site in a process called failover.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to semi-automatic failover. Semi-automatic failover enables automatic failover by a service provider as well as self-serviced failover by a service consumer. Self-serviced failover can be initiated based on a signal generated by the service provider, which can be based on analysis of an incident occurring with respect to a service provider. In accordance with one aspect, the signal can provide advice or information regarding the health of the service provider to aid a decision regarding whether or not to initiate self-serviced failover. In accordance with another aspect, the signal can grant or deny permission to a service consumer to perform a self-serviced failover.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
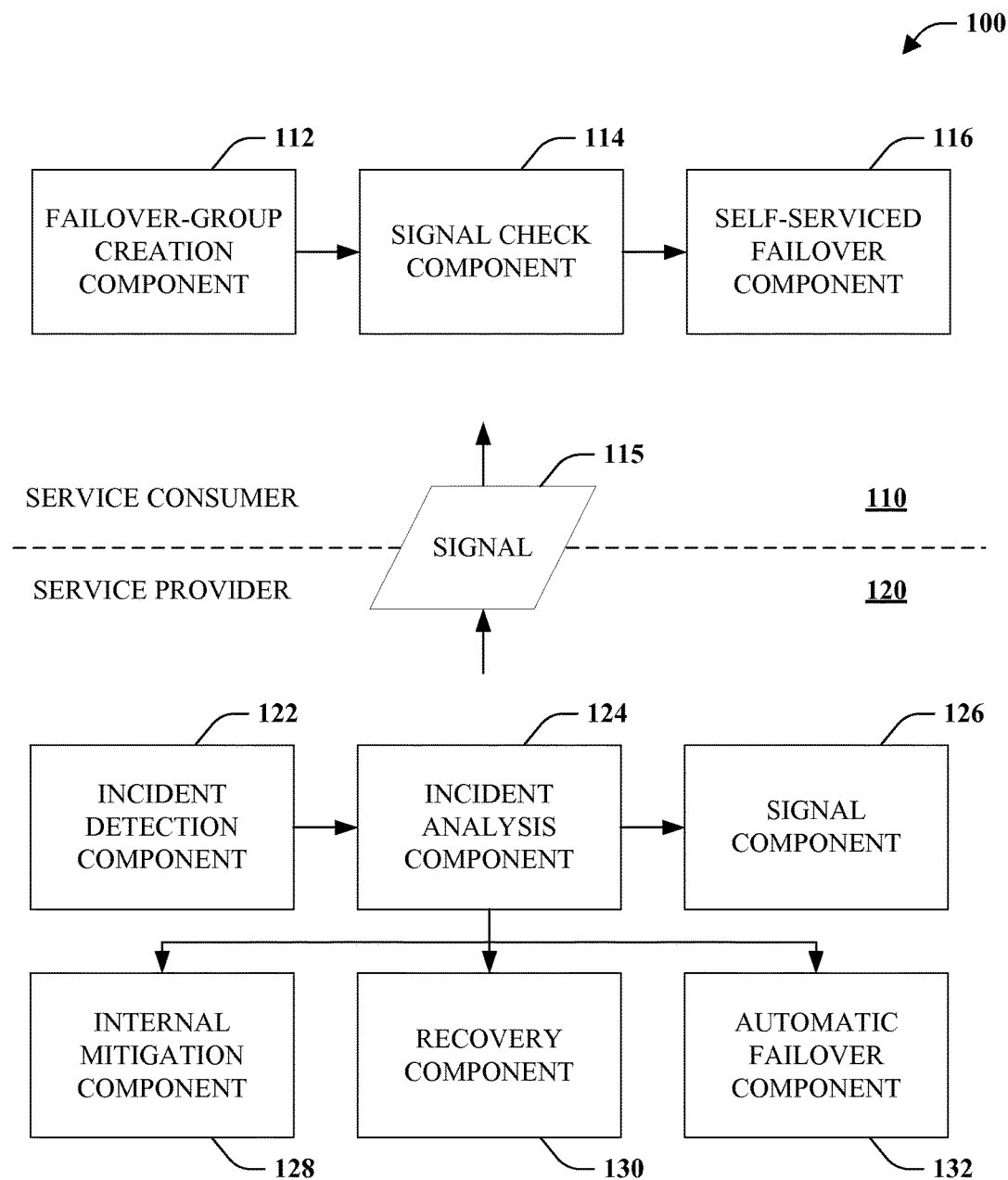
FIG. 1 is a block diagram of a semi-automatic geographic failover system.

Automatic failover is performed by a service provider after a total loss of a primary site or if it is established by the provider that the recovery of the primary will take an excessive amount time. Service providers typically employ a long recovery time objective (RTO) before initiating failover to allow sufficient time to investigate, troubleshoot, and possibly recover from an incident. Automatic failover is thus a last resort. This model works well for applications that are extremely sensitive to data loss and prefer to wait until the service provider explores all possible recovery options. However, this approach results in prolonged downtime of affected applications and is often not acceptable for applications that have aggressive availability requirements set forth in service level agreements and therefore cannot afford the extended downtime.

Existing solutions provide an application a choice of using synchronous or asynchronous replication. The former allows quick automatic failover with no data loss but results in an ongoing performance penalty on the application associated with blocking until replication is complete and acknowledged. The later includes automatic failover without the performance penalty, but with the potential for data loss and high recovery time objectives, which causes a long application downtime in case of a catastrophic failure.

Semi-automatic failover is disclosed that includes automatic failover of a service provider as well as self-serviced failover by a service consumer such as an application. Here, a service consumer can initiate failover without waiting an extended time for potential recovery or automatic failover. At the same time, support is provided for automatic failover by a service provider, if desired. Self-serviced failover can be initiated based on a signal generated by the service provider, which can be based on analysis of an incident occurring with respect to a service provider, such as evidence of a failure. In accordance with one aspect, the signal can provide information to enable a service consumer to decide whether to initiate failover and if so when to initiate failover based on availability requirements as specified in a service level agreement between the service consumer and its clients, for example. However, applications optimized for high availability may desire to initiate failover as soon as possible and continue operation with a secondary replica even if the primary replica eventually recovers and data is lost. In accordance with another aspect, the signal can grant or deny permission with respect to self-serviced failover by a service consumer. In this manner, the service provider can control when the service consumer is allowed to force failover to scenarios where such an action is warranted. Use of a rich internal monitoring infrastructure of service provider can be exploited to exclude false positives and provide a quality alert that prevents unnecessary data loss due to transient failures.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a semi-automatic failover system 100 is illustrated. As shown, there is a service consumer 110 and a service provider. The service provider 120 is configured to provide a service to the service consumer 110. Although not limited thereto, in one instance, the service provider 120 can correspond to a platform-as-a-service (PAAS) system that provides a computing platform as a service for service consumer 110. For example, the service provider 120 could host a database system that is employed by a service consumer application, such as a web application. The service consumer 110 employs a plurality of components configured to enable self-serviced failover based on a signal 115 from the service provider 120. The service provider 120 includes a number of components configured to generate the signal 115 and enable recovery or automatic failover.

The service consumer 110 includes failover-group creation component 112, signal check component 114, and self-serviced failover component 116. The failover-group creation component 112 is configured to create or specify a group of data, such as one or more databases, that will failover together. In other words, a container for data can be generated, wherein the container is replicated to a secondary site such that upon occurrence of an event that renders a primary site unavailable, the secondary site representation of the container can be utilized. A failover group defines the scope of failover upfront and ensures that all data objects in the group are available after failover regardless if the failover is initiated by the service consumer or by the service provider after a recovery time objective (RTO) is reached.

The signal check component 114 is configured to receive or retrieve the signal 115, if available. The signal 115 can provide an indication that an incident has occurred which may negatively affect the availability of service provider 120 to provide data to the service consumer 110. Although not limited thereto, the signal 115 can be embodied as a programmatic indicator (e.g., flag, variable . . . ) maintained by the service provider 120 that is accessible by the service consumer 110 by way of the signal check component 114. Additionally or alternatively, a service consumer 110 can request the signal from the service provider 120 or query a designated location.

Based at least in part on the signal 115, a decision is made as to whether or not to initiate a failover of a failover group by way of self-serviced failover component 116. The decision can be made with respect to a service consumer application in one instance. For example, if a service consumer application values availability and tolerates data loss (e.g., expressed through a software license agreement), the failover is more likely to be self-initiated with respect to the application rather than waiting on a service provider to resolve the problem or initiate automatic failover. Beyond mere existence of the signal 115, additional information can be provided by the signal 115 to aid a failover decision, such as, but not limited to, estimated time of resolution. In this regard, if the estimated time is less than a predetermined threshold, failover will be withheld, but if the estimated time of resolution is greater than or equal to a predetermined threshold, failover will be initiated. If the decision is made in favor of failover by an individual and/or computer component, the self-serviced failover component 116 initiates a transition from a primary data replica to a secondary replica, which becomes the primary replica and to which application traffic (e.g., interactions between service consumer application and service provider) will be then rerouted.

The service provider 120 includes incident detection component 122, incident analysis component 124, signal component 126, internal mitigation component 128, recovery component 130, and automatic failover component 132. The incident detection component 122 is configured to detect or otherwise identify an incident that affects performance or availability of resources. Detection can be performed automatically based on monitored information about system resources. Additionally, an incident can be deemed detected upon receipt of a report of an issue from an individual or other entity. The incident analysis component 124 is configured to analyze a detected incident and classify the impact of the incident based on one or more of factors such as resources affected, severity, and likelihood of recovery, among others. If the impact exceeds a predetermined threshold, the signal component 126 is invoked to generate a signal (e.g., raise a flag) or alter a signal in a manner that indicates to a service consumer 110 that self-serviced failover is an option for consideration due to the incident. If the impact of the incident is below a predetermined threshold, internal mitigation component 128 is invoked without invoking the signal component 126. The internal mitigation component 128 is configured to perform actions to reduce the impact of the incident and ultimately resolve the incident successfully. In accordance with one aspect, mitigation can be performed automatically by the internal mitigation component 128. Alternatively, mitigation can be performed manually by humans optionally guided by data and/or suggestions provided by the internal mitigation component 128 based at least on historical incidents, for instance. In addition to invoking the signal component 126 upon impact exceeding a predetermined threshold indicating that failover may be warranted, the recovery component 130 can also be invoked. The recovery component 130 is configured to perform actions to recover from the incident and/or support actions performed by others in recovering from the incident. Recovery efforts can continue until recovery is successfully and the incident is resolved or after a predetermined time (e.g., RTO) such as twenty-four hours from detection of the incident. If the incident has not been resolved and the predetermined time is expired, the automatic failover component 132 is invoked. The automatic failover component is 132 is configured to transition from a primary to a secondary replica such that the secondary becomes the primary.

Figure 2:
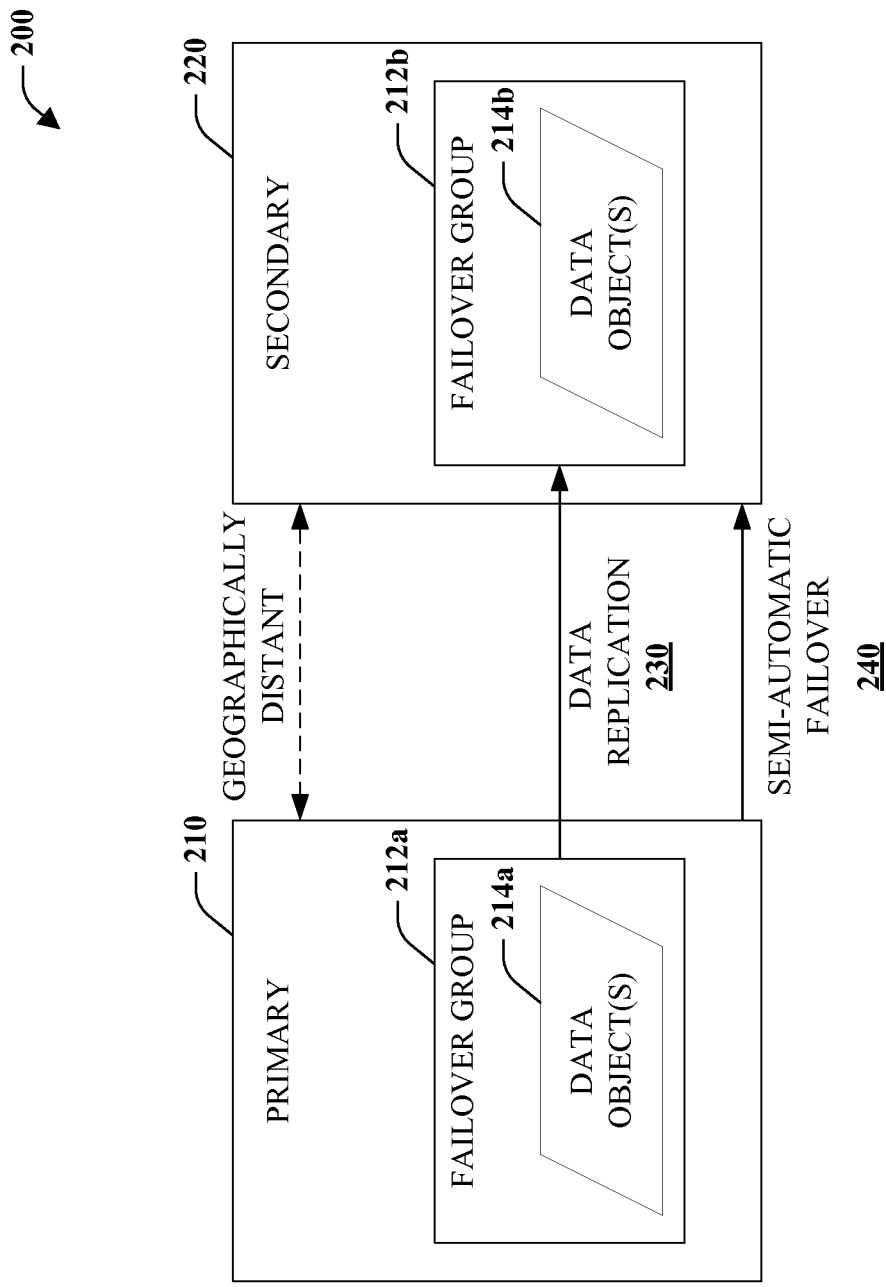
FIG. 2 is a block diagram of an exemplary failover scenario.

Turning attention to FIG. 2, an exemplary failover scenario 200 is illustrated. As shown, there is a primary 210 replica or site (e.g. data center) and a secondary 220 replica or site (e.g. data center). Although not required, here the primary 210 and the secondary 220 are geographically distant in accordance with a geo-replication implementation. For example, the primary 210 could reside on the east coast of a country while the secondary resides on the west coast. Alternatively, the primary 210 and secondary 220 could reside in different countries or different continents. In other words, the primary 210 and secondary 220 are located sufficiently distant that a disaster, such as an earthquake, tsunami, or tornado that affects the primary 210 is unlikely to affect the secondary. The primary 210 includes failover group 212a that includes a collection of one or more data objects 214a (e.g., databases) that failover together as defined by a service consumer. The failover group 212a and data object(s) 214a are replicated from the primary 210 to the secondary 220 by way of a data replication 230 producing failover group 212b and data object(s) 214b.

Data replication 230 can be performed synchronously or asynchronously. Synchronous data replication requires blocking on the primary 210 until replication of a data task (e.g., update, delete . . . ) on the secondary 220 is complete and acknowledged. This insures against data loss but negatively affects performance. Asynchronous replication enables a primary 210 to perform a data task without waiting for acknowledgement from the secondary 220 that the task was committed. Asynchronous replication avoids the performance hit of synchronous replication, but high latency due to distance between the primary 210 and the secondary 220 may result in data loss. In many cases, the improved performance associated with asynchronous data replication versus synchronous data replication is preferred even in view of potential data loss. In these cases, tolerance for data loss can be built into applications.

Semi-automatic failover 240 enables failover of the failover group 212a on the primary 210 to the failover group 212b on the secondary 220. Semi-automatic failover 240 includes automatic failover by a service provider, if necessary, as well as potentially self-serviced failover initiated by a service consumer. In other words, failover is partly or partially automatic. Self-serviced failover can be a type of forced failover. However, failover in the context of disaster recovery is typically forced, as opposed to being optional. Self-serviced failover can be characterized as manual failover. In some cases, however even automatic failover includes a manual component, for instance to approve such failover. Accordingly, as used herein self-serviced failover pertains to an action by a service consumer to initiate failover. In one instance, self-serviced failover can be initiated manually by a human user resulting in an additional automatic/manual distinction between automatic and self-serviced failover. Of course, self-serviced failover can be performed automatically, for example based on one or more preset parameters.

Returning to FIG. 1, previously the signal 115 was described as providing information to aid a decision of whether or not to failover. In accordance with another embodiment, the signal 115 governs whether or not failover is permitted by the service consumer 110. In this manner, the existence of the signal 115 or data provided by the signal 115 can grant permission to the service consumer 110 to perform a self-serviced failover. Service consumer applications, based on their service level agreement (SLA), may decide to failover as soon as possible after a failure is recognized, for example based on internal monitoring information. However, if asynchronous replication is performed, failing over can result in unnecessary data loss based on transient failure. The signal 115 or lack thereof can prevent failover in these cases. Further, the signal 115 can permit failover in situations where evidence exists a of non-transient failure condition. Stated differently, the service provider 120 controls when failover is activated by way of the signal 115 and prevents initiation of failover by the service consumer 110, until and unless the service provider 120 has determined that such an action is warranted. Since the service provider 120 will have much richer information regarding its infrastructure than the service consumer 110, this excludes false positives with respect to determining whether a failure has occurred. Furthermore, the signal 115 can simplify or eliminate service consumer 110 monitoring of the health of underlying resources to detect failure conditions, which is better handled by the service provider 120 itself, since the service provider 120 is in a better position to monitor the health of its underlying resources than a user thereof. Whether or not as well as when a self-serviced failover is initiated, if permitted, can depend on a number of factors. One factor is service level agreements between a service consumer and its clients associated with a service consumer application. Such service level agreements can include different availability requirements and tolerance for data loss in the case of asynchronous replication.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the incident detection component 122, internal mitigation component and recovery component 130 can employ such mechanisms to determine or infer a failure incident and a manner of recovering from such an incident.

Figure 3:
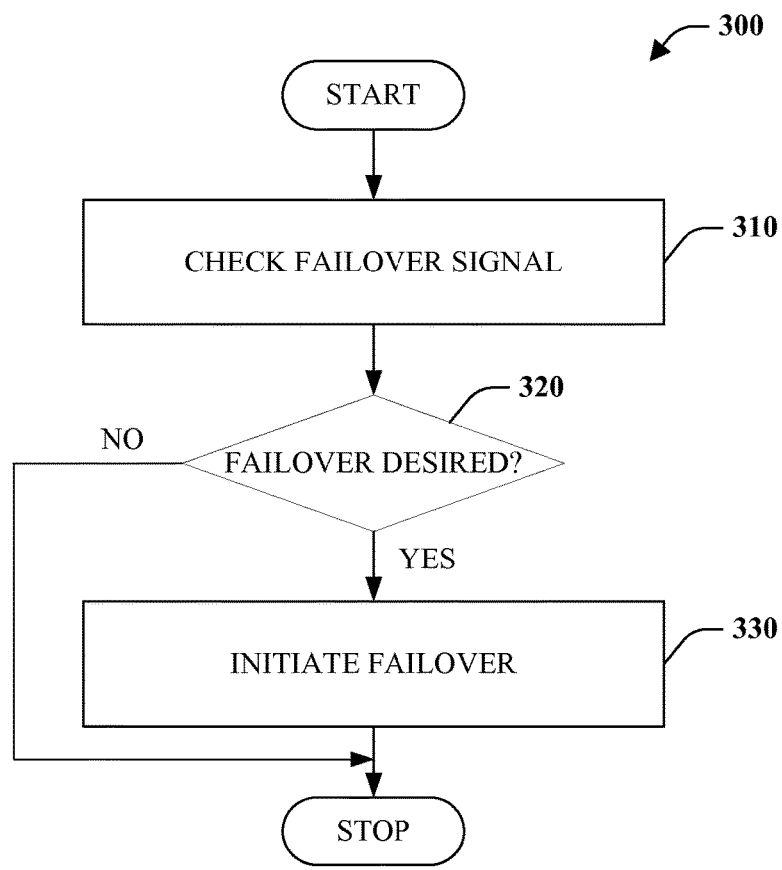
FIG. 3 is a flow chart diagram of a method of self-serviced failover.
Figure 4:
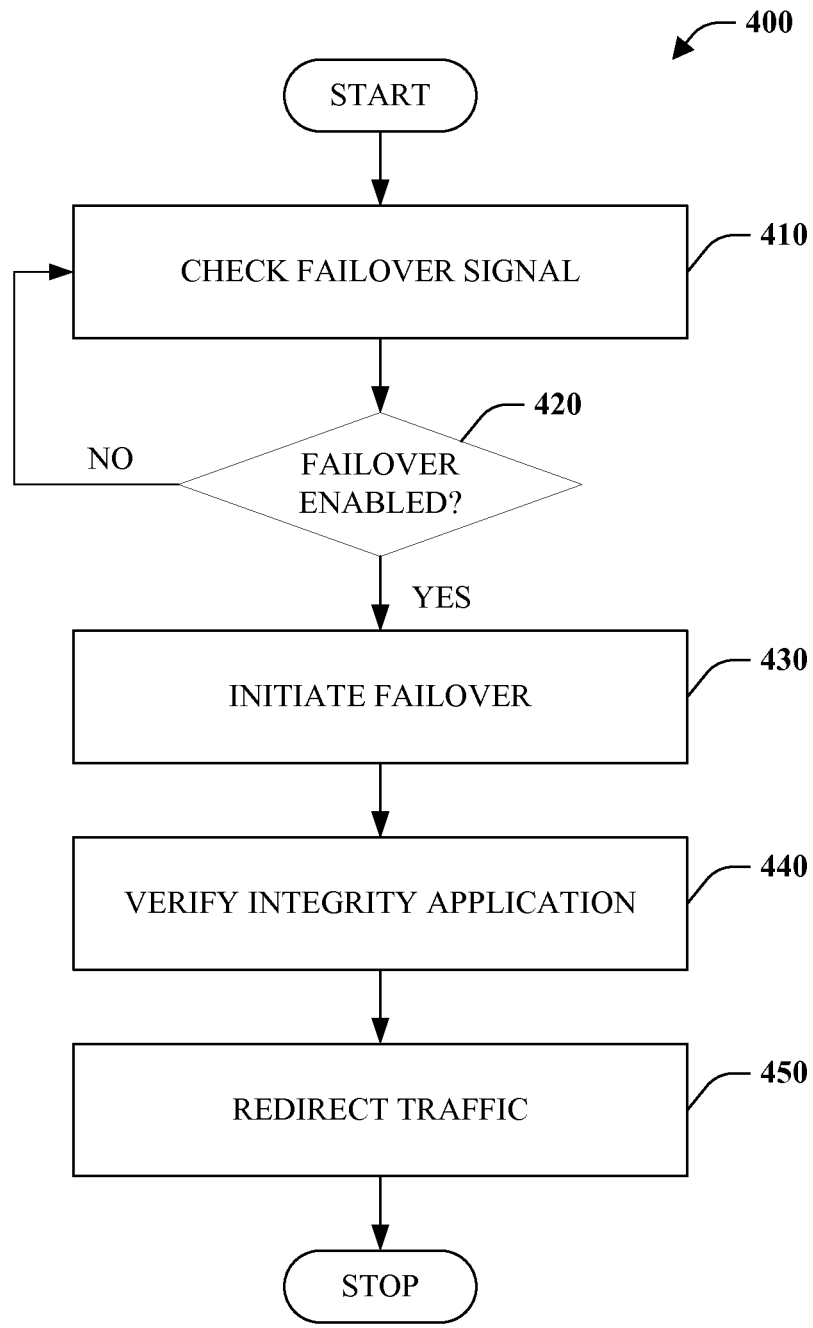
FIG. 4 is a flow chart diagram of a method of self-serviced failover.
Figure 5:
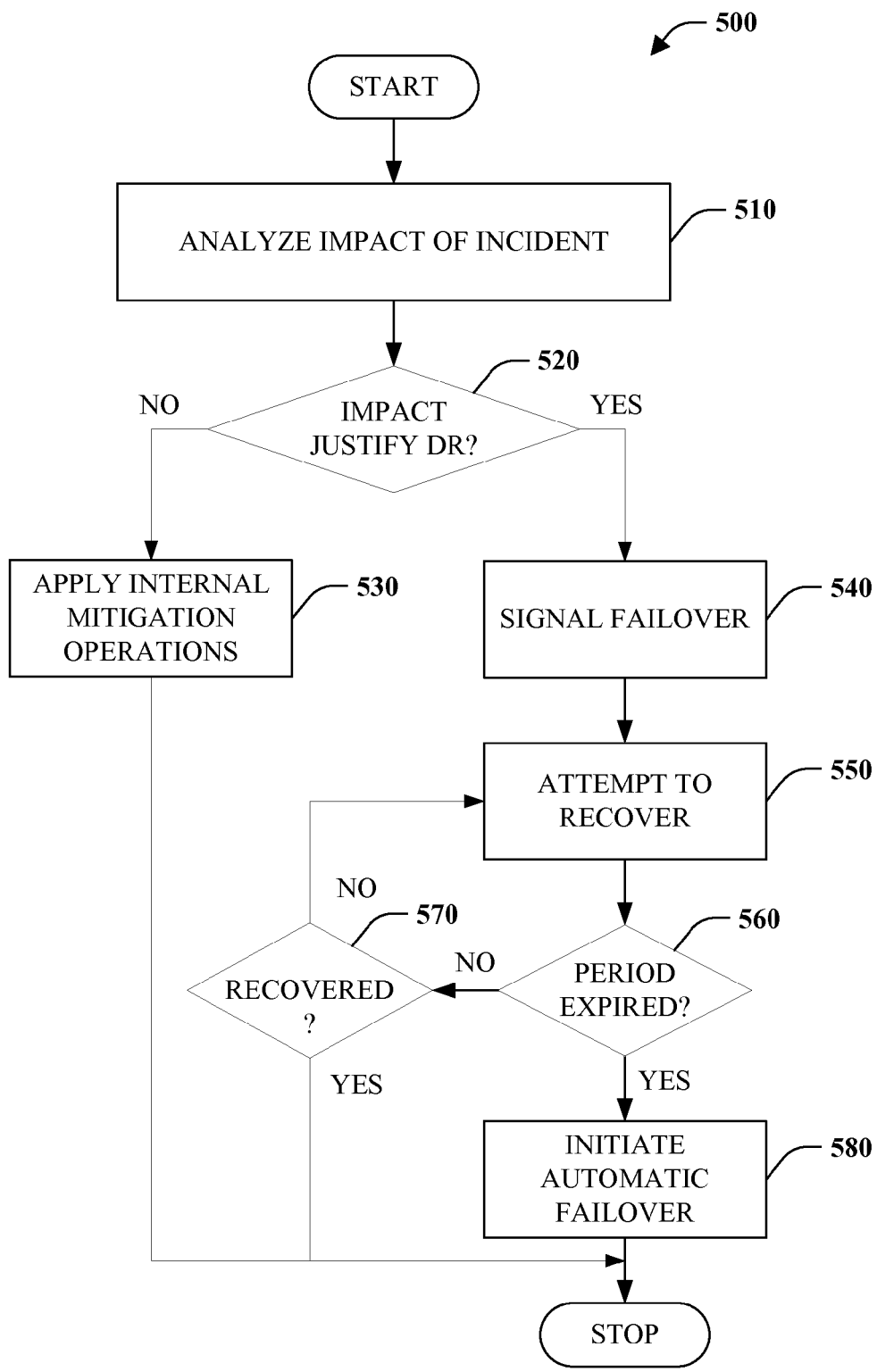
FIG. 5 is a flow chart diagram of a method incident processing.

In view of the exemplary systems described above, methodologies that may be implemented in accordance with the disclosed subject matter will be better appreciated with reference to the flow charts of FIGS. 3-5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 3, a method of self-serviced failover 300 that can be performed by a service consumer is illustrated. At reference numeral 310, a failover signal is checked. Although not limited thereto, in one instance, the signal can be embodied as a programmatic indicator of failover advice by a service provider. Checking the signal can correspond to detecting whether or not the signal is present or not. For example, a service provider can control whether or not to generate the signal. Alternatively, checking the signal can correspond to examining a value or information provided by the signal. For example, the signal can include a Boolean value of true or false and/or other information such as expected time to recovery. At numeral 320, a determination is made as to whether failover is desired. The determination can be based on the signal and any information provided by the signal as well as information outside the signal including an application service level agreement, among other things. In one instance, a service level agreement can provided for a high level of availability. To meet this agreement, the failover decision can be based solely on indication by the signal providing evidence of a failure. Additionally, the decision can be based on information provided by the signal such the likely time expected to recover as well as service-level-agreement parameters for availability and data loss. The determination of whether failover is desirable or not can also be made automatically without human input (e.g., based on previously provided parameters), semi-automatically with human input (e.g., approval of determination or with guidance from system), or based solely on human input. If failover is not desirable ("NO"), the method can simply terminate. If failover is desirable ("YES"), failover is initiated at 330. Here, failover is triggered by a service consumer as opposed to a service provider, and initiating failover corresponds to invoking a failover process, component, or system configured to redirect application requests from a primary replica to a secondary replica, among other things.

FIG. 4 is a flow chart diagram depicting a method of self-serviced failover 400 that can be performed by a service consumer. At reference numerals 410 and 420, a failover signal is checked and a determination is made as to whether or not failover is enabled, or, in other words, activated or allowed. For example, a programmatic indicator supplied by a service provider and accessible by a server consumer can be checked and whether or not failover is enabled depends on a value of the indicator. More specifically the programmatic indicator can correspond to a flag that includes Boolean values true or false, wherein true indicates failover is enabled, and false indicates failover is disabled or not enabled. If at 420, failover is not enabled ("NO"), the method continues a cyclic check at 410. If at 420, failover is enabled ("YES"), the method proceeds to numeral 430. At numeral 430, failover is initiated of data objects in a failover group. Initiating failure can correspond to invoking a failover process configured to transition from a primary replica to a secondary replica, wherein the secondary replica becomes the primary replica. Further, at numeral 440, the integrity of an application is verified in light of the service provider failure, and resolved if necessary. At reference numeral 450, traffic from an application is redirected to the secondary replica, which is the new primary replica.

FIG. 5 illustrates a method of processing an incident 500 that can be performed by a service provider. At reference numeral 510, an incident is received or detected, or inferred, and analyzed to determine the impact, if any, of the incident. The incident can be any event or action that affects the ability to provide consumers with service and can include natural events, malicious user activity, as well as failure of commodity hardware and human error, among other things. Incidents can be reported by individuals or detected automatically based on monitoring actions performed by a service provider infrastructure. Impact of the incident can be analyzed and classified. For example, impact can be classified by the influence on consumer service, the extent of effect (e.g., one server, one rack, an entire data center), and the severity of an incident (e.g., temporary, permanent), among other things.

At reference numeral 520, a determination is made as to the whether disaster recovery is justified based on the impact. In particular, the impact is compared to a predetermined threshold. If the impact does not justify disaster recovery at 520, the method continues to apply internal mitigation operations to resolve the incident. If, at 520, it is determined that the impact justifies disaster recovery ("YES"), the method continues at 540 where failover signal is generated, enabled, or the like. The signal can operate to provide advice or permission by the service provider to a service consumer regarding the health of the underlying service provider system and consumer initiated failover. Although not limited thereto, in one embodiment the signal can correspond to a programmatic indicator (e.g., variable, flag . . . ) accessible by the service provider.

At numeral 550, automatic, manual, or a combination of automatic and manual efforts are performed in an attempt to recover the primary site or replica from the incident. At reference numeral 560, a determination is made as to whether or not a time period has expired. For example, the time period could be a predetermined time after receiving or detecting the incident, such as twenty-four hours. If at 560, it is determined that the time period has not expired ("NO"), the method continues at 570, where a determination is made as to whether recovery was successful with respect to the incident. If recovery was successful ("YES"), the method terminates. If recovery has not been successful ("NO"), the method continues at 550 where attempt are made to recover. If at numeral 560, the time period has expired ("YES"), the method proceeds to numeral 580. In other words, the recovery is attempted for a predetermined time (e.g., RTO) until either recovery is successful or time expires. At numeral 580, automatic failover is initiated by the service provider for replicas affected by the incident not previously subject to self-serviced failover initiated by a service consumer. Such automatic failover can happen without warning. However, automatic failover could be implemented to require manual approval.

The subject disclosure supports various products and processes that perform, or are configured to perform, various actions regarding semi-automatic failover. What follows are one or more exemplary methods, systems, and computer-readable storage mediums.

A method comprises employing at least one processor configured to execute computer-executable instructions stored in memory to perform the acts of receiving a signal from a service provider and determining whether or not to initiate a self-serviced failover based on the signal. The method further comprises determining whether or not to initiate the self-serviced failover based a service level agreement for service consumer application. In one instance, failover can correspond to geographic failover. The method further comprises receiving the signal from the service provider that grants permission to initiate the failover and denies permission to perform the failover. The method further comprises receiving the signal from the service provider that provides a computing platform as a service. Additionally, the method further comprises receiving the signal from the service provider that provides health information regarding the service provider. The method further comprises initiating the self-serviced failover redirecting application requests from a primary replica to a secondary replica.

A system comprises a processor coupled to a memory, the processor configured to execute a computer-executable component stored in the memory including a first component configured to produce a signal with respect to self-serviced failover for a service consumer based on analysis of an incident occurring with respect to a service provider. In a first instance, the signal at least one of grants or denies permission to perform the self-serviced failover. In a second instance, the signal provides information regarding health of the service provider. In a third instance, the signal is a programmatic indicator accessible by the service consumer. In addition, the service provider provides a computing platform as a service the system comprises a second component configured to initiate automatic failover of one or more replicas that where not subject to prior self-serviced failover. The second component is further configured to initiate automatic failover after expiration of a predetermined time if recovery attempts are unsuccessful.

A method comprises employing at least one processor configured to execute computer-executable instructions stored in memory to perform the act of producing a signal configured to at least one of grant or deny permission to a consumer of a computing service to perform a self-serviced geographical failover based on analysis of an incident by a provider of the computing service. The method further comprises producing the signal configured to provide information about the incident; producing the signal configured to specify an estimated time of resolution; producing the signal that grants permission prior to performing automatic failover; and producing the signal comprises updating a programmatic indicator accessible by the consumer. The method further comprises initiating automatic failover of at least one replica for which failover was not performed by way of self-serviced failover. The method further comprises initiating automatic failover of a service consumer defined failover group.

A computer-readable storage medium having instructions stored thereon that enables at least one processor to perform a method upon execution of the instructions, the method comprising receiving a signal from a service provider and determining whether or not to initiate a self-serviced failover based on the signal. The method further comprises determining whether or not to perform the self-serviced failover based a service level agreement for service consumer application. The method further comprises receiving the signal from the service provider that grants permission to initiate the failover and denies permission to perform the failover. The method further comprises receiving the signal from the service provider that provides a computing platform as a service. Additionally, the method further comprises receiving the signal from the service provider that provides health information regarding the service provider. The method further comprises initiating the self-serviced failover redirecting application requests from a primary replica to a secondary replica.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
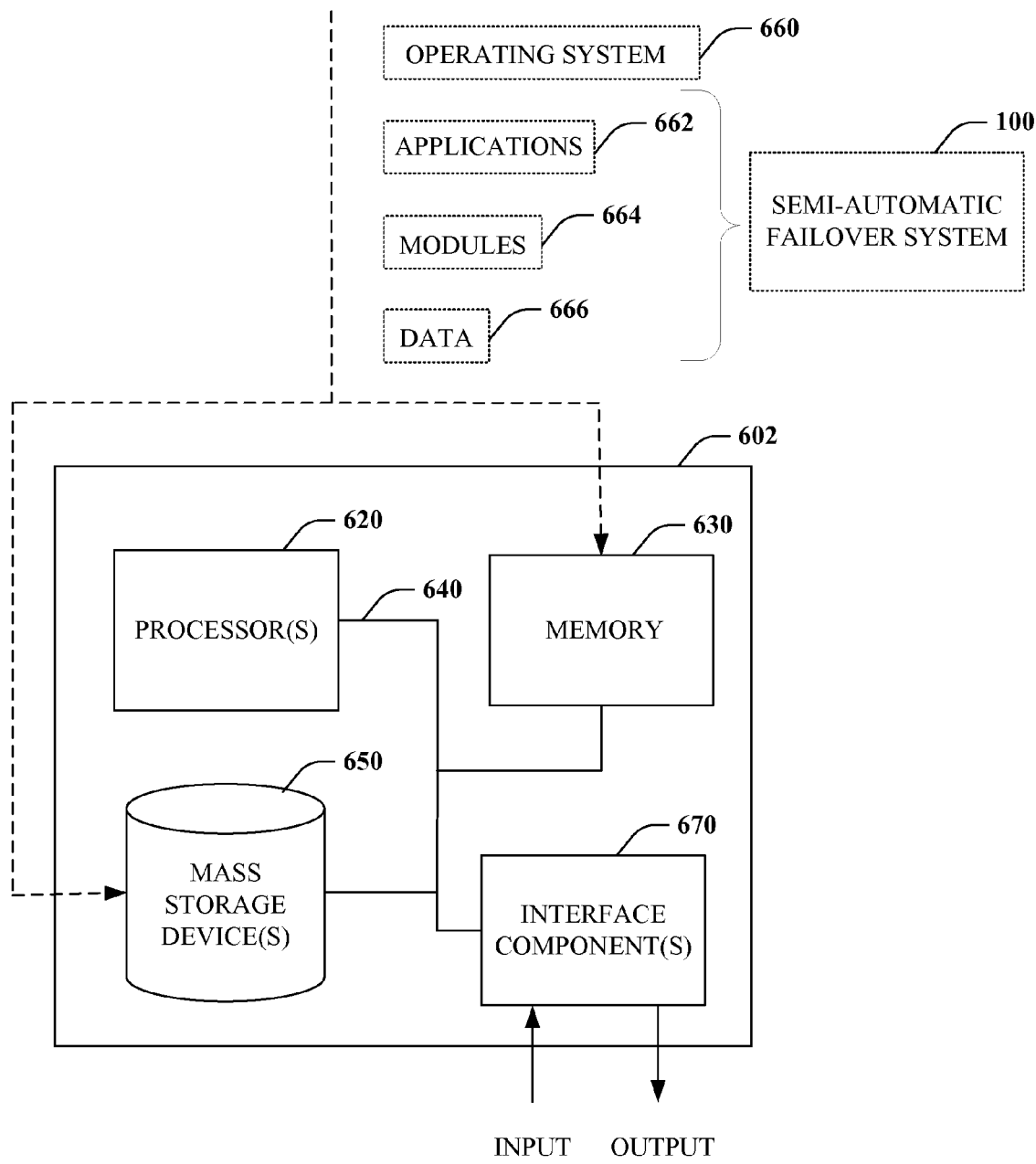
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory devices.

With reference to FIG. 6, illustrated is an example general-purpose computer or computing device 602 (e.g., desktop, laptop, tablet, watch, server, hand-held, programmable consumer or industrial electronics, set-top box, game system, compute node . . . ). The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 602. Accordingly, computer storage media excludes modulated data signals.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, semi-automatic failover system 100 or portions thereof, can be, or form part, of an application 662, and include one or more modules 664 and data 666 stored in memory and/or mass storage device(s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the semi-automatic failover system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire . . . ) or an interface card (e.g., sound, video . . . ) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 670 can be embodied as an output peripheral interface to supply output to displays (e.g., LCD, LED, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of coordinating a provision of a service between a primary site and a secondary site on behalf of a user, the method involving a device having a processor and comprising:
executing, by the processor, instructions that cause the device to:
using a service level agreement for the service, perform a comparison of a data loss risk reduction of the service, and a high availability objective for the service;
based on the comparison, select a recovery time threshold, wherein the recovery time threshold is extended if the comparison indicates a preference for the data loss risk reduction, and the recovery time threshold is reduced if the comparison indicates a preference for the high availability objective;
among a set of data objects of the service, identify a selection of a subset of the data objects as a failover group;
monitor the primary site to detect a service failure of the service provided by the primary site; and
responsive to a failover instruction comprising at least one of:
a user-initiated failover request received from the user, and
an automated failover request initiated by a duration of the service failure exceeding the recovery time threshold, for traffic of the service that utilizes the data objects of the failover group, redirect the traffic from the primary site to the secondary site.

2. The method of claim 1, wherein:
the service further comprises a set of underlying resources; and
monitoring the primary site to detect a service failure of the service further comprises: monitoring the underlying resource of the service to detect a resource failure of at least one failed underlying resource of the service.

3. The method of claim 1, wherein:
the user further comprises a service consumer of the service;
the service further comprises a service consumer permissions set that identifies whether the service consumer is permitted to initiate a user-initiated failover request; and
redirecting the traffic of the service responsive to the user-initiated failover request further comprises:
determining whether the user-initiated failover request is permitted by the service consumer permissions set; and
redirecting the traffic from the primary site to the secondary site only after verifying that the user-initiated failover request is permitted by the service consumer permissions set.

4. The method of claim 3, wherein:
the service consumer permissions set further identifies a severity threshold of the service failure over which the service consumer is permitted to initiate the user-initiated failover request; and
determining whether the user-initiated failover request is permitted by the service consumer permissions set further comprises:
identifying a severity of the service failure of the service provided by the primary site; and
determining whether the severity of the service failure exceeds the severity threshold identified in the service consumer permissions set.

5. The method of 1, wherein:
the user further comprises a service consumer of the service;
the service is managed by a service administrator; and
redirecting the traffic of the service responsive to the user-initiated failover request further comprises:
requesting, from the service administrator, acceptance of the user-initiated failover request by the service consumer; and
redirecting the traffic from the primary site to the secondary site only after receiving from the service administrator the acceptance of the user-initiated failover request by the service consumer.

6. The method of claim 1, wherein detecting the service failure of the service provided by the primary site further comprises:
detecting an incident of the service that indicates a possible incident of service failure; and
classifying an impact of the incident on the service using at least one impact factor selected from an impact factor set comprising:
a scope of the impact over a resource set of the service;
a severity of the impact of the incident upon provision of the service by the primary site; and
a likelihood of recovery from the impact of the incident upon the provision of the service by the primary site.

7. The method of claim 1, wherein detecting the service failure of the service provided by the primary site further comprises:
classifying the service failure as one of a transient service failure and a non-transient service failure; and
responsive to classifying the service failure as a non-transient service failure, reducing the recovery time threshold of the service.

8. The method of claim 1, wherein:
detecting the service failure of the service provided by the primary site further comprises:
receiving an expected recovery time to recover from the impact of the incident upon provision of the service by the primary site, and
comparing the expected recovery time and the recovery time threshold; and
redirect the traffic from the primary site to the secondary site further comprises: responsive to determining that the expected recovery time exceeds the recovery time threshold, redirect the traffic from the primary site to the secondary site.

9. The method of claim 1, wherein redirecting the traffic from the primary site to the secondary site responsive to the automated failover request further comprises:
present, to the user, a recommendation to redirect the traffic from the primary site to the secondary site in response to the service failure; and
redirecting the traffic only after receiving from the user an acceptance of the recommendation.

10. The method of claim 1, wherein determining that the duration of the service failure exceeds the recovery time threshold further comprises: evaluating a recovery process of the primary site to determine a restoration of the service by the primary site.

11. The method of claim 1, wherein:
the primary site further comprises an incident mitigation process; and
detecting the service failure of the service provided by the primary site further comprises:
evaluating a severity of the service failure upon the provision of the service by the primary site; and responsive to determining that the severity of the service failure is below a severity threshold, invoking the incident mitigation process of the primary site to recover from the service failure of the service.

12. The method of claim 1, wherein monitoring the primary site to detect the service failure of the service further comprises:
receiving, from a reporting user of the service, a user-generated report of an issue observed by the reporting user; and
evaluating the user-generated report of the issue to determine an impact of the issue on the service provided by the primary site.

13. The method of claim 1, wherein:
the service is utilized by an application provided by a service consumer; and
monitoring the primary site to detect the service failure of the service further comprises:
receiving, from the application, an automated report of an issue; and
evaluating the automated report of the issue to determine an impact of the issue on the service provided by the primary site.

14. The method of claim 13, wherein redirecting the traffic from the primary site responsive to the service failure further comprises:
presenting a failover recommendation to the application provided by the service consumer; and
responsive to receiving, from the application, an acceptance of the failover recommendation, redirecting the traffic from the primary site to the secondary site.

15. The method of claim 1, wherein redirecting the traffic from the primary site responsive to the service failure further comprises:
evaluating an integrity of the data objects of the failover group at the secondary site; and
redirecting the traffic from the primary site to the secondary site only after verifying the integrity of the data objects of the failover group at the secondary site.

16. The method of claim 1, wherein:
the service is associated with a failover permission set that specifies whether failover from the primary site to the secondary site is permitted for the service; and
redirecting the traffic from the primary site responsive to the service failure further comprises:
determining, according to the failover permission set, whether failover from the primary site to the secondary site is permitted for the service provided by the primary site; and
redirecting the traffic from the primary site to the secondary site only after verifying that failover from the primary site to the secondary site is permitted for the service.

17. The method of claim 1, wherein the recovery time threshold is based at least in part on a synchronization schedule of the failover group between the primary site and the secondary site.

18. A primary server of a primary site that provides a service, the primary server comprising:
a processor; and
a memory storing instructions that, when executed by the processor, cause the primary server to coordinating a provision of a service between a primary site and a secondary site and administrated by a user, by:
using a service level agreement for the service, performing a comparison of a data loss risk reduction of the service, and a high availability objective for the service;
based on the comparison, selecting a recovery time threshold, wherein the recovery time threshold is extended if the comparison indicates a preference for the data loss risk reduction, and the recovery time threshold is reduced if the comparison indicates a preference for the high availability objective;
among a set of data objects of the service, identifying a selection of a subset of the data objects as a failover group;
monitoring the primary site to detect a service failure of the service provided by the primary site; and
responsive to a failover instruction comprising at least one of:
a user-initiated failover request received from the user, and
an automated failover request initiated by a duration of the service failure exceeding the recovery time threshold, for traffic of the service that utilizes the data objects of the failover group, redirecting the traffic from the primary site to the secondary site.

19. A system of a primary server that coordinating a provision of a service between a primary site and a secondary site and administrated by a user, the system comprising:
a recovery time threshold selector that:
using a service level agreement for the service, performs a comparison of a data loss risk reduction of the service, and a high availability objective for the service;
based on the comparison, selects a recovery time threshold, wherein the recovery time threshold is extended if the comparison indicates a preference for the data loss risk reduction, and the recovery time threshold is reduced if the comparison indicates a preference for the high availability objective;
a data object store that identifies, among a set of data objects of the service, a selection of a subset of the data objects as a failover group;
a service monitor that monitors the primary site to detect a service failure of the service provided by the primary site; and
a failover handler that, responsive to a failover instruction comprising at least one of:
a user-initiated failover request received from the user, and
an automated failover request initiated by a duration of the service failure exceeding the recovery time threshold, for traffic of the service that utilizes the data objects of the failover group, redirecting the traffic from the primary site to the secondary site.

* * * * *